United States Patent
K et al.

(10) Patent No.: US 10,460,612 B2
(45) Date of Patent: Oct. 29, 2019

(54) SAFE SONIC ALTITUDE GENERATION

(71) Applicant: HONEYWELL INTERNATIONAL INC., Morris Plains, NJ (US)

(72) Inventors: Nathan K, Karnataka (IN); Anoop S, Karnataka (IN); Sabu Mathew, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 7 days.

(21) Appl. No.: 15/823,867

(22) Filed: Nov. 28, 2017

(65) Prior Publication Data

US 2019/0164437 A1    May 30, 2019

(51) Int. Cl.
*G08G 5/00*    (2006.01)
*B64C 30/00*    (2006.01)

(52) U.S. Cl.
CPC ......... *G08G 5/0039* (2013.01); *G08G 5/0013* (2013.01); *G08G 5/0021* (2013.01); *G08G 5/0047* (2013.01); *G08G 5/0052* (2013.01); *G08G 5/0091* (2013.01); *B64C 30/00* (2013.01)

(58) Field of Classification Search
CPC .......................... G08G 5/0039; G08G 5/0047
See application file for complete search history.

(56) References Cited

U.S. PATENT DOCUMENTS

| | | | |
|---|---|---|---|
| 8,145,366 B1 | 3/2012 | Haering, Jr. et al. | |
| 8,362,925 B2 | 1/2013 | Brinkman et al. | |
| 9,401,091 B2 | 7/2016 | N et al. | |
| 9,558,668 B2 | 1/2017 | Letsu-Dake et al. | |
| 10,209,122 B1* | 2/2019 | Suddreth | G01H 17/00 |
| 2005/0098681 A1 | 5/2005 | Berson et al. | |
| 2008/0288164 A1* | 11/2008 | Lewis | G08G 5/0034 |
| | | | 701/120 |

(Continued)

FOREIGN PATENT DOCUMENTS

EP    2642465 A2    9/2013

OTHER PUBLICATIONS

Joslin, R., et al.; Sonic Boom Awareness in the Civil Supersonic Cockpit; Presented to: Flight Test Safety Workshop Apr. 23-25, 2013.

(Continued)

*Primary Examiner* — Aaron L Troost
(74) *Attorney, Agent, or Firm* — Lorenz & Kopf, LLP

(57) ABSTRACT

Methods and systems for flight control of a supersonic ownship are provided. The systems utilize sources of weather data, a flight management system (FMS) of the supersonic ownship, and sources of neighbor traffic data. The systems generate a complete neighbor traffic flight trajectory, and then process the complete neighbor traffic flight trajectory with a flight plan of the supersonic ownship, aircraft specific parameters, and forecasted and real-time weather data to generate therefrom a safe sonic altitude for flying the supersonic ownship. The safe sonic altitude is transmitted to air traffic control (ATC) as a request for an assignment. Upon receiving the assignment from ATC, the systems notify the pilot of the assignment and continue monitoring airspace for real-time changes in the flight path trajectory of the neighbor traffic. The sonic altitude is updated based on a detected real-time change in the flight path trajectory of the neighbor traffic.

16 Claims, 5 Drawing Sheets

(56) References Cited

U.S. PATENT DOCUMENTS

| | | |
|---|---|---|
| 2010/0286900 A1 | 11/2010 | Depape et al. |
| 2013/0080043 A1* | 3/2013 | Ballin ................. G08G 5/0034 |
| | | 701/120 |
| 2014/0012500 A1* | 1/2014 | Savarit ................ G08G 5/0039 |
| | | 701/527 |
| 2014/0300495 A1 | 10/2014 | Scheu et al. |
| 2016/0049080 A1 | 2/2016 | Bazawada et al. |

OTHER PUBLICATIONS

Smith-Velazquez et al., Synthetic Vision Display with Integral Sonic Boom Predictions, Proceedings of SPIE, May 5, 2017, pp. 1019708-1-1019708-14, vol. 10197.

* cited by examiner

US 10,460,612 B2

SAFE SONIC ALTITUDE GENERATION

TECHNICAL FIELD

The present invention generally relates to mobile platform control systems, and more particularly relates to generating safe sonic altitudes for supersonic aircraft.

BACKGROUND

As air travel becomes more and more common, and airspace becomes more crowded, there is increased interest in employing supersonic aircraft. Supersonic aircraft have challenges related to the supersonic travel. In particular, supersonic travel creates compressed pressure waves around the supersonic aircraft. The compressed pressure waves generally result in a noise called a sonic boom. Commonly, and as used herein, the phrase "sonic boom" references both the pressure waves and the associated noise. The sonic boom has a potential to adversely affect neighboring aircraft, particularly those flying below the supersonic aircraft. Conventional aircraft flight control methods often determine when a supersonic aircraft may travel at supersonic speeds based on geography (for example, when the supersonic aircraft is over a water body rather than above neighboring aircraft), and this means the supersonic aircraft may be unable to travel at supersonic speeds for a significant percentage of its flight path.

Accordingly, improvements to aircraft flight control methods and systems are desirable. Specifically, technologically improved aircraft flight control systems and methods that increase the percentage of an assigned flight path that a supersonic aircraft can fly at supersonic speeds are desirable. Furthermore, other desirable features and characteristics of the present disclosure will become apparent from the subsequent Detailed Description and the appended claims, taken in conjunction with the accompanying drawings and this Background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A flight control method for a supersonic ownship with an ownship flight plan is provided. The method comprises: receiving, from air traffic control (ATC), a planned neighbor traffic flight plan; referencing aircraft specific parameters; collecting weather data; generating a sonic altitude for the ownship responsive to processing the host flight path, planned neighbor traffic flight plan, aircraft specific parameters, and the weather data; transmitting the sonic altitude to ATC; receiving an assignment to the sonic altitude from ATC; and notifying a pilot of the ownship of the assignment to the sonic altitude.

A flight control system is provided. The system comprising: a source of weather data; a flight management system (FMS) comprising a flight plan for an ownship; a source of neighbor traffic data; and a control module coupled to the source of weather data, the FMS, and the source of neighbor traffic data, the control module configured to: generate a complete neighbor traffic flight trajectory; generate a sonic altitude for the ownship based on the flight plan, the neighbor traffic flight trajectory, aircraft specific parameters, and weather data; transmit the sonic altitude to ATC; receive, from ATC, an assignment to the sonic altitude; and notify a pilot of the ownship of the assignment to the sonic altitude.

Another flight control method for a supersonic ownship is provided. The method comprising: at a control module comprising aircraft specific parameters: receiving an ownship flight plan; receiving a planned neighbor traffic flight plan from air traffic control (ATC); generating a complete flight path trajectory of the ownship; generating a complete flight path trajectory of a neighbor traffic; collecting weather data; processing the ownship flight path trajectory, the neighbor traffic flight path trajectory, aircraft-specific parameters, and weather data, to generate therefrom a sonic altitude; transmitting a request for an assignment to the updated sonic altitude to ATC; receiving an assignment to the updated sonic altitude from ATC; and notifying a pilot of the assignment to the updated sonic altitude.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any theory presented in the preceding background or the following detailed description.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The provided system and method may take the form of a control module (FIG. 1, 104), and may be separate from, or integrated within, a preexisting mobile platform management system, avionics system, or aircraft flight management system (FMS).

Exemplary embodiments of the disclosed flight control system 102, and sonic altitude control module (FIG. 1, 104), perform a complete trajectory analysis of an ownship (FIG. 4, 402) and complete trajectory analysis of neighboring traffic (FIGS. 4, 404 and 406), determine a safe sonic altitude. The safe sonic altitude is a safe flight level for the supersonic aircraft to fly at without adverse effects to neighboring aircraft; it is the result of modeling a sonic boom zone for the supersonic aircraft. As used herein, complete trajectory analysis means trajectory analysis of the entire flight path, from takeoff to landing. The complete trajectory analysis begins as a static evaluation of the flying environment of an ownship, based on filed flight plans received from air traffic control (ATC), and becomes a dynamic evaluation, based on automatic dependent surveillance broadcast (ADS-B) input from neighboring traffic, which are continually monitored for changes. With the complete trajectory analysis, and some of the additional features described below, the control module 104 delivers a technological improvement over conventional flight control systems that effectively increase the percentage of a flight plan that the supersonic aircraft flies at supersonic speed. These features and additional functionality are described in more detail below.

Figure 1:
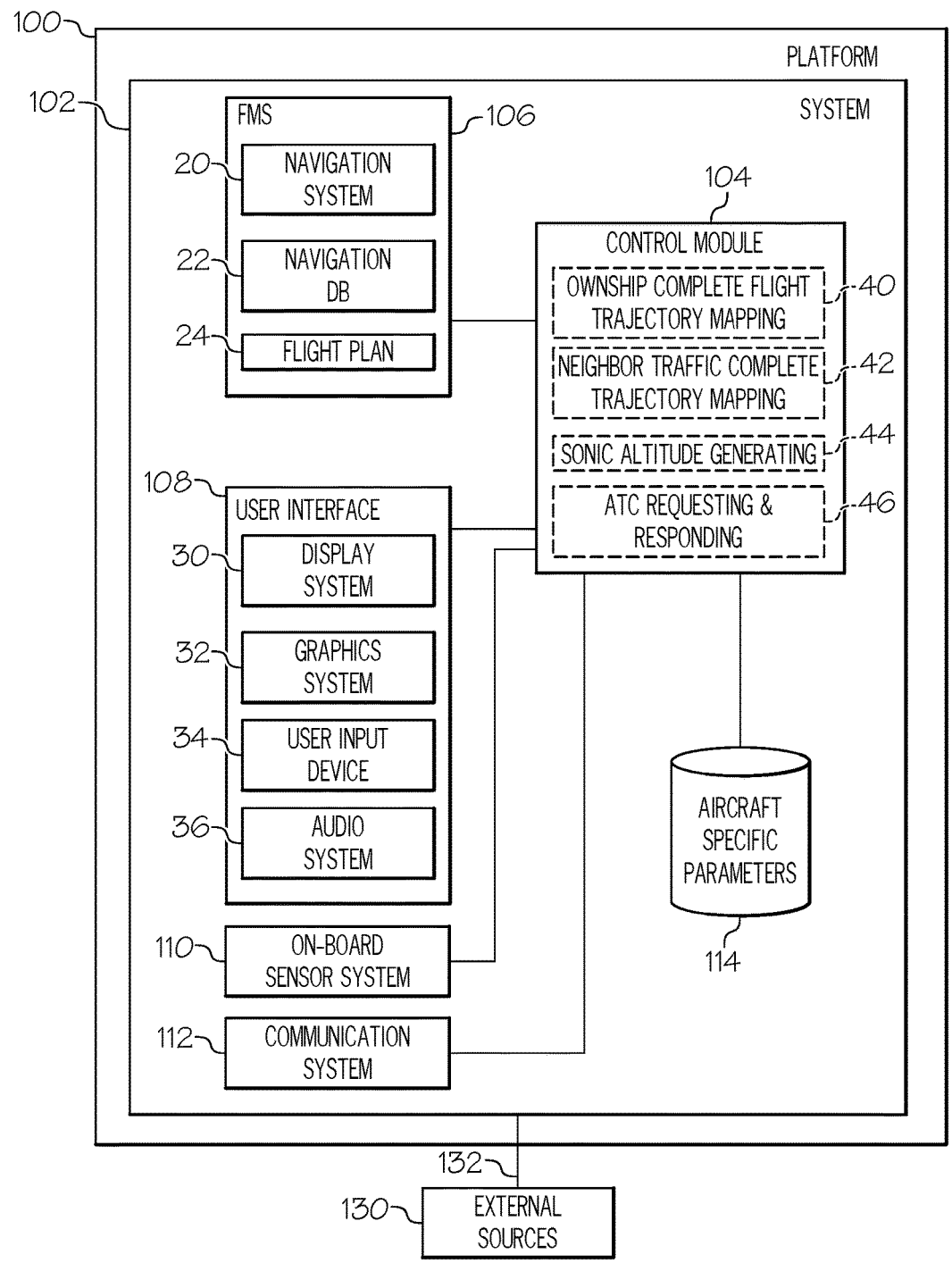
FIG. 1 is a block diagram of an enhanced flight control system, in accordance with an exemplary embodiment.

Turning now to FIG. 1, a functional block diagram of a platform 100 including a flight control system 102 (also referred to herein as "system" 102) employing the sonic altitude control module 104 (also referred to herein as "control module" 104). In the embodiments described herein, the platform 100 is an aircraft, and may be referred to as aircraft 100. In the described embodiments, the control module 104 is generally realized as commanding a technologically enhanced flight control system within the aircraft 100; however, the concepts presented herein can be deployed in a variety of mobile platforms, spacecraft, and the like. Accordingly, in various embodiments, the control module 104 may reside elsewhere and/or enhance part of larger aircraft traffic awareness system, avionics management system, or platform management system. Further, it will be appreciated that the system 102 may differ from the embodiment depicted in FIG. 1. For example, aspects of the user input device 34, display system 30, and graphics system 32 may form a control display unit (CDU) used for command and control of the FMS 106.

The control module 104 may be operationally coupled to: a Flight Management System (FMS) 106, a user interface 108 (which may comprise one or more of a display system 30, a graphics system 32, a user input device 34, and an audio system 36), an on-board sensor system 110, a communication system 112, and an aircraft-specific parameters database 114. The operation of these functional blocks is described in more detail below.

Figure 2:
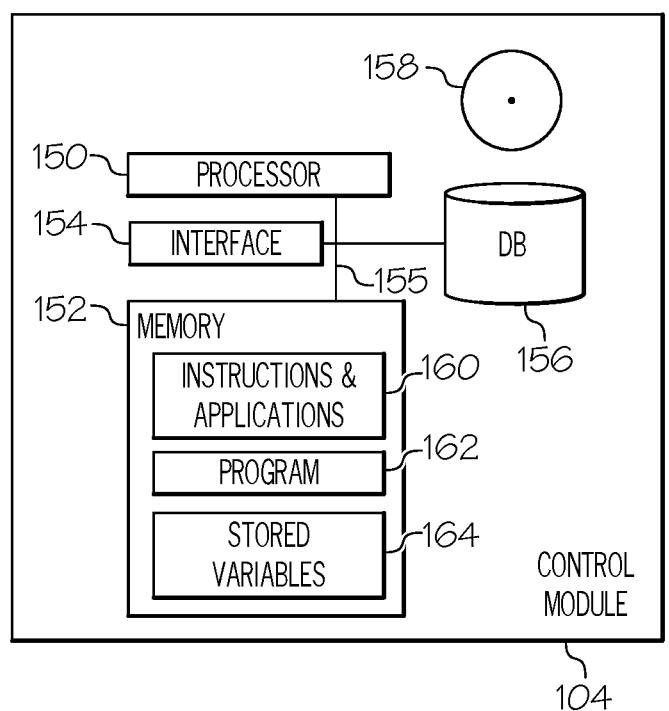
FIG. 2 is a block diagram of the control module of FIG. 1, in accordance with an exemplary embodiment.

The FMS 106 comprises a navigation system 20 and a navigation database 22 and memory for storing a pre-programmed flight plan 24. The pre-programmed flight plan 24 is understood to comprise, for an ownship, an assigned, complete path and trajectories along the path, from an origin to a destination. The navigation system 20 comprises sensors for determining instantaneous current position for the aircraft 100. The instantaneous current position of a vehicle or aircraft 100 may be referred to as aircraft state data, and/or position determining data, and comprises the current latitude, longitude, heading, and the current altitude or above ground level for the aircraft. The means for ascertaining current or instantaneous aircraft state data for the aircraft 100 may be realized, in various embodiments, as a global positioning system (GPS), inertial reference system (IRS), or a radio-based navigation system (e.g., VHF Omni-directional radio range (VOR) or long range aid to navigation (LORAN)), and may include one or more navigational radios or other sensors suitably configured to support operation of the navigation system 20, as will be appreciated in the art. Under direction of the program 162 (see FIG. 2), the control module 104 may process navigation data to determine an aircraft instantaneous position with respect to a flight plan 24 and guide the aircraft along the flight plan 24. The control module 104 may also process the flight plan 24 and position determining data to determine a current phase of flight.

The navigation database 22 may comprise waypoint information, airport features information, runway position and location data, holding patterns, flight procedures, approach procedures, and various flight planning and distance measuring rules and parameters. The FMS 106 is configured to provide guidance, such as lateral navigation (LNAV) and vertical navigation (VNAV), to a crew, based on processing the aircraft state data with information within the navigation database 22. As used herein, "navigation data" may comprise data and information from the navigation system 20 and the navigation database 22.

A user interface 108 is coupled to the control module 104, and cooperatively configured to allow a user (e.g., a pilot, co-pilot, or crew member) to interact with the display system 30, the FMS 106, and/or other elements of the system 102 in a conventional manner. The user interface 108 comprises one or more systems (display system 30, a graphics system 32, a user input device 34, and an audio system 36) described below.

In general, the display system 30 may include any device or apparatus suitable for displaying (also referred to as rendering) flight information or other data associated with operation of the aircraft in a format viewable by a user. The display devices may provide three dimensional or two dimensional images, and may further provide synthetic vision imaging. Accordingly, a display device responds to a respective communication protocol that is either two-dimensional or three, and may support the overlay of text, alphanumeric information, or visual symbology. Non-limiting examples of such display devices include cathode ray tube (CRT) displays, and flat panel displays such as LCD (liquid crystal displays) and TFT (thin film transistor) displays. In practice, the display system 30 may be part of, or include, a primary flight display (PFD) system, a multi-function display (MFD), a panel-mounted head down display (HDD), a head up display (HUD), or a head mounted display system, such as a "near to eye display" system.

The renderings of the display system 30 may be processed, at least in part, by the graphics system 32. Display methods include various types of computer generated symbols, text, and graphic information representing, for example, pitch, heading, flight path, airspeed, altitude, runway information, waypoints, targets, obstacle, terrain, and required navigation performance (RNP) data in an integrated, multi-color or monochrome form. In some embodiments, the graphics system 32 may be integrated within the control module 104; in other embodiments, the graphics system 32 may be integrated within the display system 30. Regardless of the state of integration of these subsystems, responsive to receiving display commands from the control module 104, the display system 30 displays, renders, or otherwise visually conveys, one or more graphical representations or images associated with operation of the ownship 402 (FIG. 4), as described in greater detail below. In various embodiments, images displayed on the display system 30 may also be responsive to processed user input that was received via a user input device 34.

The user input device 34 may include any one, or combination, of various known user input device devices including, but not limited to: a touch sensitive screen; a cursor control device (CCD) (not shown), such as a mouse, a trackball, or joystick; a keyboard; one or more buttons, switches, or knobs; a voice input system; and a gesture recognition system. Non-limiting examples of uses for the user input device 34 include: entering values for stored variables 164, loading or updating instructions and applications 160, loading and updating program 162, and loading and updating the contents of the database 156, each described in more detail below. In addition, pilots or crew may enter flight plans, Standard Operating Procedures (SOP), and the like, via the user input device 34. In embodiments using a touch sensitive screen, the user input device 34 may be integrated with a display device in display system 30.

The audio system 36 may comprise any combination of speakers, bells, or alarms sufficient to generate sound in the form of speech and/or alarms that the crew can hear. The audio system 36 may receive commands from the control module 104 and convert the commands into emitted speech and sounds. Accordingly, the audio system 36 may comprise a means for converting the commands into the emitted sounds. In some embodiments, the audio system 36 comprises necessary components to perform speech recognition.

The on-board sensor system 110 comprises a variety of different sensors, each directed to sensing a respective different aspect of the aircraft 100 while in flight. Non-limiting examples of sensors include: wind direction and velocity sensors, fuel-level sensors, engine temperature sensors, humidity sensors, cabin sensor sensors, and system status sensors. With specific focus on systems and components making up the aircraft, the sensor system comprises appropriate sensors to detect operational use and functional status of systems such as brakes, flaps, lights, line replacement units (LRUs), and the like. Real-time aircraft sensor data therefore includes real-time weather data, aircraft system data, and line replacement unit (LRU) data.

The communication system 112 is configured to support communications via communications link 132, between the ownship 402 and external data source(s) 130. The communication system 112 and communications link 132 embody one or more industry-standard wireless communication protocols, such as, datalink, controller-pilot data link (CPDLC), a traffic collision and avoidance system (TCAS), and automatic dependent surveillance broadcast (ADS-B). Non-limiting examples of data received from the external source(s) 130 includes, for example, instantaneous (i.e., real time or current) air traffic control (ATC) communications (via CPDLC), neighbor aircraft data and information from TCAS, neighbor traffic data and information from ADS-B, and weather communications and forecasts (such as, from the Federal Aviation Association (FAA), the Hazardous In-Flight Weather Advisory Service (HIWAS), and various other weather advisory services). In this regard, the communication system 112 may be realized using a radio communication system and/or another suitable data link system. The communication system 112 and communications link 132 may also embody wired and direct communication protocols that may be used in an initialization step, in which parameters and executable programs are loaded into respective components of the system 102. External source(s) 130 may comprise air traffic control (ATC), neighbor aircraft or traffic, and other suitable command centers.

The aircraft-specific parameters database 114 comprises parameters, such as, identification and performance parameters, such as weight, engine size and capability, and the like. The aircraft-specific parameters may be referenced to obtain parameters that are specific to the ownship 402, as well as parameters that are specific to one or more neighbor traffic. The aircraft-specific parameters may be pre-loaded into the aircraft-specific parameters database 114, and then transferred to memory 152 within the control module 104, during execution of a sonic boom model and generation of the sonic boom altitude. Accordingly, in some embodiments, the aircraft-specific parameters are already included in the control module 104.

The control module 104 processes input from the operationally coupled components and performs the functions of: ownship complete flight trajectory mapping 40; neighbor traffic complete flight trajectory mapping 42; sonic altitude generation 44; and ATC requesting and responding 46. The control module 104 and its functions are further described in connection with FIGS. 2 and 3, as follows.

The control module 104 includes an interface 154, communicatively coupled to a processor 150 and memory 152 (via a bus 155), database 156, and an optional storage disk 158. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals.

The memory 152, the navigation database 22, the aircraft-specific parameters database 114, the database 156, and optional disk 158 maintain data bits and may be utilized by the processor 150 as both storage and a scratch pad. The memory locations where data bits are maintained are physical locations that have particular electrical, magnetic, optical, or organic properties corresponding to the data bits. The memory 152 can be any type of suitable computer readable storage medium. For example, the memory 152 may include various types of dynamic random access memory (DRAM) such as SDRAM, the various types of static RAM (SRAM), and the various types of non-volatile memory (PROM, EPROM, and flash). In certain examples, the memory 152 is located on and/or co-located on the same computer chip as the processor 150. In the depicted embodiment, the memory 152 stores the above-referenced instructions and applications 160 along with one or more configurable variables in stored variables 164. The database 156 and the disk 158 are computer readable storage media in the form of any suitable type of storage apparatus, including direct access storage devices such as hard disk drives, flash systems, floppy disk drives and optical disk drives. The database 156 may include an airport database (comprising airport features) and a terrain database (comprising terrain features), parameters and instructions for runway detection and selection, and parameters and instructions for generating alerts as described herein. In combination, the features from the airport database and the terrain database are referred to as map features. Information in the database 156 and memory 152 may be organized and/or imported from an external source 130, or by programming via the user input device 34, during an initialization step of a process (see initialization 302 FIG. 3).

The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The interface 154 enables communications within the control module 104, can include one or more network interfaces to communicate with other systems or components, and can be implemented using any suitable method and apparatus. For example, the interface 154 enables communication from a system driver and/or another computer system. In one embodiment, the interface 154 obtains data from external data source(s) 130 directly. The interface 154 may also include one or more network interfaces to communicate with technicians, and/or one or more storage interfaces to connect to storage apparatuses, such as the database 156.

During operation, the processor 150 loads and executes one or more programs, algorithms and rules embodied as instructions and applications 160 contained within the memory 152 and, as such, controls the general operation of the control module 104 as well as the system 102. In executing the process described herein, such as the method 300 of FIG. 3, the processor 150 specifically loads and executes the instructions and sonic boom models embodied in the novel sonic boom algorithm: program 162. Within the control module 104, the processor 150 and the memory 152 form a processing engine performing processing activities, data conversion, and data translation that result in the functions of the control module 104, as is described in more detail below. The control module 104 may perform its functions in accordance with steps of a method (FIG. 3, method 300).

Additionally, the processor 150 is configured to, in accordance with the program 162: process received inputs (selectively, any combination of input from the set including: the FMS 106, the user interface 108, the on-board sensor system 110, the communication system 112, and external sources 130); reference any of the databases (such as, the aircraft-specific parameters database 114, the navigation database 22, and the database 156); and, generate commands that command and control the user interface 108 (specifically, the display system 30 and the audio system 36).

Figure 3:
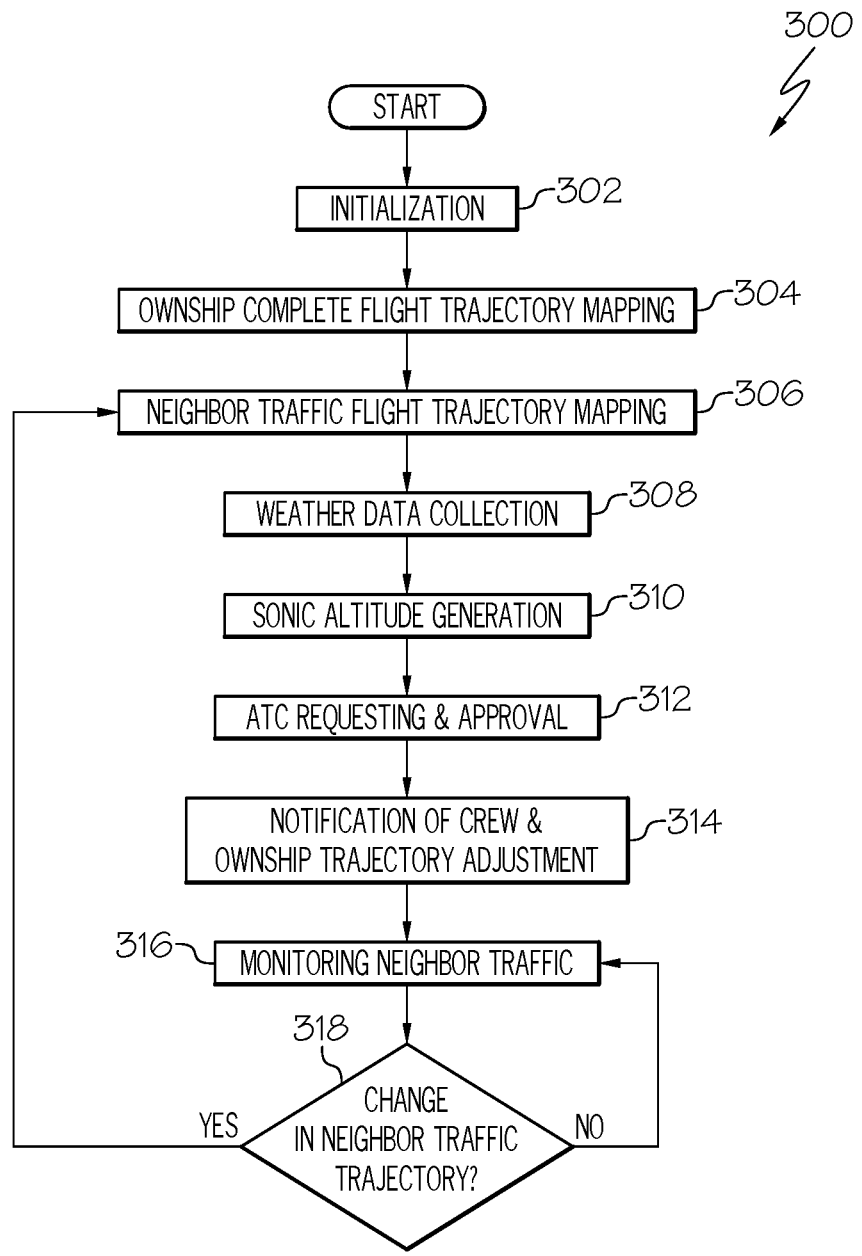
FIG. 3 is a flow chart for a method for enhanced flight control, in accordance with an exemplary embodiment.

As mentioned, the control module 104 may be used to implement a method 300, as shown in the flow chart of FIG. 3. For illustrative purposes, the following description of method 300 may refer to elements mentioned above in connection with FIG. 1 and FIG. 2. In practice, portions of method 300 may be performed by different components of the described system. It should be appreciated that method 300 may include any number of additional or alternative tasks, the tasks shown in FIG. 3 need not be performed in the illustrated order, and method 300 may be incorporated into a more comprehensive procedure or method having additional functionality not described in detail herein. Moreover, one or more of the tasks shown in FIG. 3 could be omitted from an embodiment of the method 300 as long as the intended overall functionality remains intact.

The method starts, and at 302 the control module 104 is initialized. As mentioned above, initialization may comprise uploading or updating instructions and applications 160, program 162, stored variables 164, and the various lookup tables stored in the database 156. Examples of parameters that may be stored in stored variables 164 include parameters used by the instructions and applications 160 and the program 162, and the like. Stored variables 164 may also include various shapes, sizes, and color rendering references for flight images, buttons and displays such as employed on a graphical user interface (GUI) displayed on the display system 30. The program 162 may also include additional instructions and rules for commanding any of a variety of specific devices within display system 30 and/or audio system 36.

At 304, the complete flight path trajectory of the ownship is generated or mapped from its origin to its intended destination. Selectively, any of the flight plan 24, a user input device 34, and an external source 130 may be a source of data from which to generate the complete flight path trajectory of the ownship. At 306, the complete flight path trajectory of one or more neighbor traffic is generated or mapped, again, from its origin to its intended destination. Flight plans for neighbor traffic may be filed with ATC a day ahead of a planned flight. Accordingly, neighbor traffic flight plans may be received from ATC via communications link 132. Neighbor traffic are external sources 130 in the functional model of FIG. 1. During flight, real-time neighbor traffic flight path/trajectory information may be received via the communications link 132, via a protocol such as ADS-B. Weather data is collected at 308, however, in operation, real-time weather data collection is continually performed by the method 300. Collected weather data, therefore, includes instantaneous, real-time weather data (sensed as well as received from an external source 130), as well as forecasted weather data relevant to the complete flight path trajectory of the ownship 402.

Figure 4:
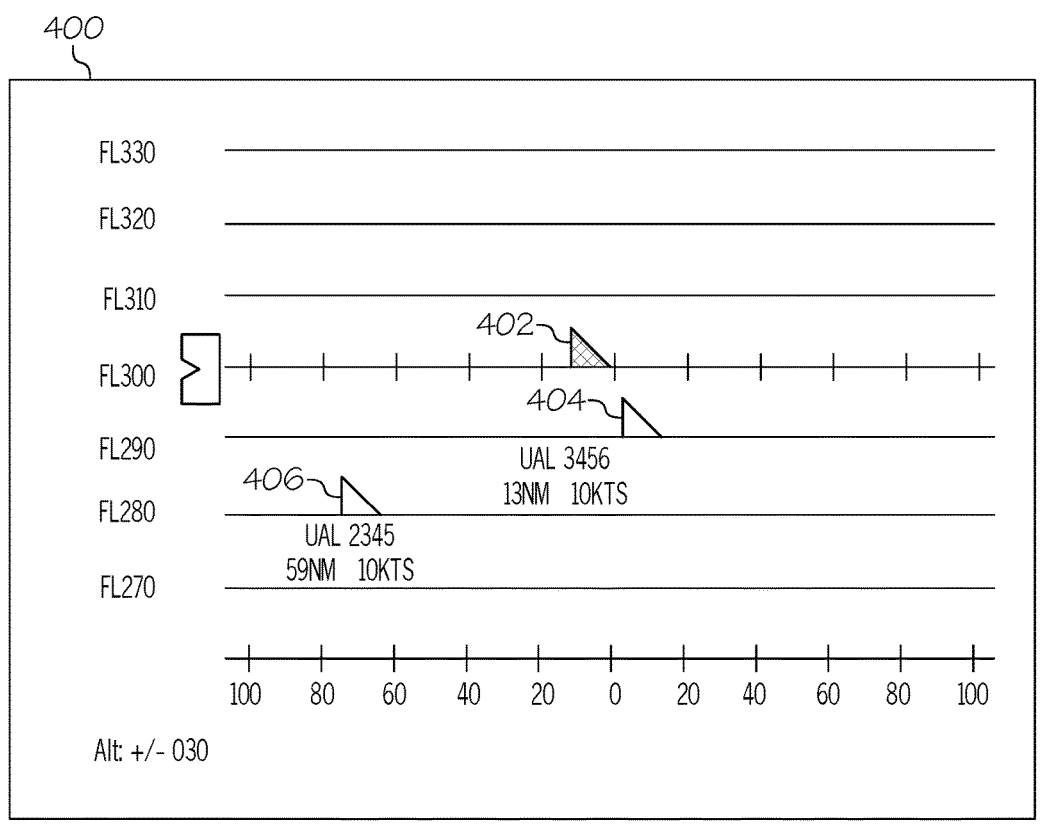
FIG. 4 is a vertical map showing an ownship and neighbor traffic, in accordance with an exemplary embodiment.

With continued reference to FIGS. 1-3, FIGS. 4-6 are additionally referenced hereinbelow. A vertical profile 400 that is a two dimensional view of a volume of predetermined size around the ownship 402 may be rendered on the display system 30. Ownship 402 is the sonic aircraft. Vertical profile 400 graphs altitude, in flight levels (FL), along a y-axis and nautical miles (NM) along an x-axis. The two dimensional rendering is understood to represent a portion of the complete flight trajectory for each of (i) the ownship 402, and (ii) one or more neighbor traffic (404, 406). While only two neighbor traffic are depicted in FIG. 4, the control module 104 may monitor and process data from a plurality of neighbor traffic. In various embodiments, vertical profile 400 is centered on the ownship 402. As can be seen, for each neighbor traffic within the volume around the ownship, flight identifying information for the neighbor traffic is displayed alongside an icon depicting the neighbor traffic at its location on the vertical profile. Specifically, in FIG. 4, the ownship 402 is depicted at flight level 300 (FL 300), and its nose is at 0 on the x-axis. A first neighbor traffic 404 is depicted at FL 290 and 13 nautical miles in front of ownship 402. A second neighbor traffic 406 is at FL 280 and 59 nautical miles behind ownship 402.

At 310, the method generates a safe sonic altitude for the ownship 402. The safe sonic altitude is generated by processing inputs comprising: the ownship flight path trajectory, the neighbor traffic flight path trajectory, aircraft-specific parameters for the ownship 402 and for the neighbor traffic, and weather data. (As mentioned ownship flight path trajectory is mapped at 304 and neighbor traffic flight path trajectory is mapped at 306). The safe sonic altitude is associated with the ownship's flight plan. It is to be understood that, on subsequent passes through 310, if any of the inputs have changed, in particular if weather data has had a real-time change or a neighbor traffic flight path trajectory has had a real-time change, an updated sonic altitude is generated at 310, using the updated weather data and/or the change to the neighbor traffic flight path trajectory. In some embodiments, the updated sonic altitude further comprises a lateral flight path offset for the ownship 402.

Figure 5:
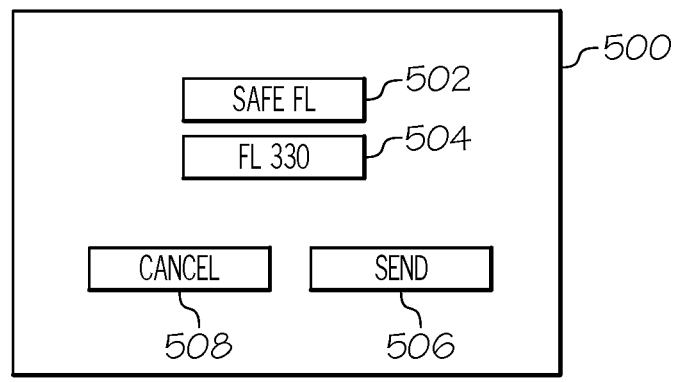
FIG. 5 is an image showing an interactive display of a safe sonic altitude, in accordance with an exemplary embodiment.

Once generated, the pilot is notified of the sonic altitude. FIG. 5 depicts an example of using a graphical user interface on a multi-function display (MFD) for pilot notification and interaction of the safe sonic altitude; other embodiments may rely on speech or gesture interaction methods. The example depicted in FIG. 5, an interactive image 500 displays the text, "safe FL" 502, and the generated safe sonic altitude, 33000 feet, in text, "FL 330" 504.

At 312, ATC requesting and approval occurs. The pilot may opt to transmit the sonic altitude (send 506) to air traffic control (ATC), as a request for an assignment to the sonic altitude. Alternatively, the pilot may cancel the sonic altitude (cancel 508). Subsequent to the pilot selecting "send," the sonic altitude is transmitted to air traffic control (ATC) as a request for an assignment to the sonic altitude. Transmitting and receiving between ATC (as an external source 130) and the control module 104 may be via a controller pilot data link communication (CPDLC) message. The received approval (of the request for assignment to the sonic altitude) from ATC is effectively an assignment to the sonic altitude.

Figure 6:
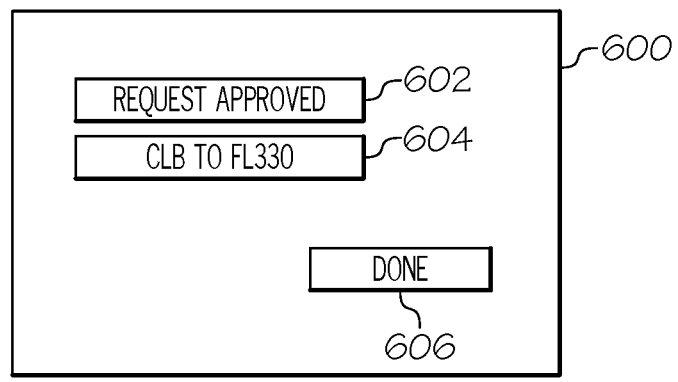
FIG. 6 is an image showing an interactive display of an approved safe sonic altitude, in accordance with an exemplary embodiment.

Subsequent to receiving the assignment, the pilot is notified of the assignment at 314, with flight instructions for achieving the assigned sonic altitude (i.e., the assigned flight level (FL)) FIG. 6 image 600 depicts an example of pilot notification of an assigned sonic altitude that uses a MFD; other embodiments may rely on speech or gesture communication. "Request Approved" is displayed at 602, and the flight instructions to climb to flight level 330, "CLB to FL 330," are displayed at 604. Once the pilot has viewed this information, the pilot may close out this round of generating a safe sonic boom altitude by selecting "done" at 606. In embodiments in which the update to the sonic altitude comprises a lateral flight path offset for the ownship, notifying the pilot of the assignment to the updated sonic altitude further comprises notifying the pilot of assignment to the lateral flight path offset for the ownship.

A pilot then performs any flight level adjustment that is assigned by ATC, and flies the ownship 402 accordingly. During flight, the method 300 continually monitors (at 316) the airspace around the ownship 402. At 318, when there is a change in trajectory of a neighbor traffic (i.e., change in the first neighbor aircraft 404, change in the second neighbor aircraft 406, or a new neighbor traffic is detected), the method returns to 306 to generate an updated sonic altitude based thereon. While no change in neighbor aircraft trajectory is detected, the method cycles on monitoring neighbor traffic at 316. The cycling on 316 may continue until the ownship 402 has landed at its destination.

Accordingly, the exemplary embodiments discussed above provide a technologically improved flight control system 102 that generates a safe sonic altitude based on complete flight path trajectories of the supersonic ownship and neighboring traffic. The embodiments manage communications with ATC regarding assigning the safe sonic altitude to the supersonic ownship. The technologically improved flight control system 102 evaluates complete flight trajectories for the ownship and neighbor aircraft, as well as real-tire and predicted weather data.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flight control method for a supersonic ownship with an ownship flight plan for travel along an assigned flight path, the method comprising:
    on-board the supersonic ownship,
    receiving, from air traffic control (ATC), a neighbor traffic's flight plan;
    referencing aircraft specific parameters for the supersonic ownship and the neighbor traffic;
    collecting weather data;
    mapping a complete flight path trajectory of the supersonic ownship from its origin to its intended destination;
    mapping a complete flight path trajectory of the neighbor traffic from its origin to its intended destination, based on the received flight plan;
    processing the complete flight path trajectory of the supersonic ownship, the complete flight path trajectory of the neighbor traffic, aircraft specific parameters for the ownship, aircraft specific parameters for the neighbor traffic, and the weather data to thereby generate a safe sonic altitude for the supersonic ownship, the safe sonic altitude being an altitude that maximizes a percentage of the assigned flight path that the supersonic ownship can travel at supersonic speed;
    transmitting the safe sonic altitude to ATC;
    receiving an assignment to the safe sonic altitude and flight instructions for achieving the safe sonic altitude from ATC; and
    notifying a pilot of the supersonic ownship of the assignment to the safe sonic altitude and flight instructions for achieving the safe sonic altitude.

2. The method of claim 1, wherein:
    transmitting to ATC comprises transmitting, via a controller pilot data link communication (CPDLC) message, a request for assignment to the sonic altitude.

3. The method of claim 2, wherein:
    receiving from ATC comprises receiving via a controller pilot data link communication (CPDLC) message.

4. The method of claim 3, further comprising:
    receiving, via an automatic dependent surveillance broadcast (ADS-B), a real-time update to the neighbor traffic flight path trajectory; and
    updating the safe sonic altitude for the supersonic ownship responsive to the real-time update to the neighbor traffic flight path trajectory;
    transmitting, to ATC, the updated safe sonic altitude;
    receiving, from ATC, an assignment to the updated safe sonic altitude and flight instructions for achieving the updated safe sonic altitude; and
    notifying a pilot of the assignment to the updated safe sonic altitude.

5. The method of claim 4, wherein updating the safe sonic altitude comprises a lateral flight path offset for the ownship.

6. The method of claim 5, wherein notifying the pilot of the assignment to the updated sonic altitude comprises notifying the pilot of assignment to the lateral flight path offset.

7. The method of claim 3, wherein the neighbor traffic's flight plan is one of a plurality of neighbor traffics' respective flight plans, and further comprising:
receiving, from air traffic control (ATC), the plurality of respective neighbor traffics' flight plans;
for each neighbor traffic of the plurality of neighbor traffic, mapping a complete flight path trajectory from its origin to its intended destination; and
wherein generating the safe sonic altitude for the ownship is further responsive to processing each complete flight path trajectory of the plurality of neighbor traffic.

8. The method of claim 3, wherein the neighbor traffic's flight plan is one of a plurality of neighbor traffics' respective flight plans, and further comprising:
receiving, from air traffic control (ATC), the plurality of respective neighbor traffics' flight plans;
for each neighbor traffic of the plurality of neighbor traffic, mapping a complete flight path trajectory from its origin to its intended destination; and
generating the safe sonic altitude for the ownship is further responsive to processing each complete flight path trajectory of neighbor traffic;
receiving, via automatic dependent surveillance broadcast (ADS-B), a real-time update to more than one of the neighbor traffic flight path trajectories; and
updating the safe sonic altitude based on the more than one real-time updates to the neighbor traffic flight path trajectories;
transmitting the updated safe sonic altitude to ATC;
receiving an assignment to the updated sonic altitude from ATC and flight instructions for achieving the updated safe sonic altitude; and
notifying the pilot of the assignment to the updated safe sonic altitude and flight instructions for achieving the updated safe sonic altitude.

9. A flight control system, comprising:
a source of weather data;
a flight management system (FMS) comprising a flight plan for a supersonic ownship to travel along an assigned flight path;
a source of neighbor traffic data; and
a control module coupled to the source of weather data, the FMS, and the source of neighbor traffic data, the control module configured to:
map a complete flight path trajectory of the supersonic ownship from its origin to its intended destination;
generate a complete neighbor traffic flight trajectory from its origin to its intended destination using its flight plan;
process the complete flight path trajectory of the supersonic ownship, the complete flight path trajectory of the neighbor traffic, aircraft specific parameters for the ownship, aircraft specific parameters for the neighbor traffic, and weather data to
generate a safe sonic altitude for the supersonic ownship the safe sonic altitude being an altitude that maximizes a percentage of the assigned flight path that the supersonic ownship can travel at supersonic speed;
transmit the safe sonic altitude to ATC;
receive, from ATC, an assignment to the safe sonic altitude and flight instructions for achieving the updated safe sonic altitude; and
notify a pilot of the ownship of the assignment to the safe sonic altitude and flight instructions for achieving the updated safe sonic altitude.

10. The flight control system of claim 9, wherein the control module is configured to transmit the safe sonic altitude to ATC via a controller pilot data link communication (CPDLC) message, as a request for assignment to the safe sonic altitude.

11. The flight control system of claim 10, wherein the control module is configured to receive the approval for the request for assignment to the safe sonic altitude via a controller pilot data link communication (CPDLC) message.

12. The flight control system of claim 11, wherein the control module is further configured to:
receive, via automatic dependent surveillance broadcast (ADS-B), a real-time update to the neighbor traffic flight path trajectory; and
update the safe sonic altitude for the supersonic ownship responsive to the real-time update to the neighbor traffic flight path trajectory;
transmit the updated safe sonic altitude to ATC;
receive an assignment to the updated safe sonic altitude from ATC; and
receive an assignment to the updated sonic altitude and flight instructions for achieving the updated safe sonic altitude from ATC; and
notify the pilot of the supersonic ownship of the assignment to the updated safe sonic altitude and flight instructions for achieving the updated safe sonic altitude.

13. The flight control system of claim 11, wherein:
the update to the safe sonic altitude comprises a lateral flight path offset for the ownship.

14. The flight control system of claim 11, wherein the neighbor traffic's flight plan is one of a plurality of neighbor traffics' respective flight plans, and wherein the control module is further configured to:
receive, from air traffic control (ATC), the plurality of respective neighbor traffics' flight plans;
for each neighbor traffic of the plurality of neighbor traffic, map a complete flight path trajectory from its origin to its intended destination; and
generate the safe sonic altitude for the ownship further responsive to processing each complete flight path trajectory of the plurality of neighbor traffic.

15. The flight control system of claim 11, wherein the neighbor traffic's flight plan is one of a plurality of neighbor traffics' respective flight plans, and wherein the control module is further configured to:
receive, from air traffic control (ATC), the plurality of respective neighbor traffics' flight plans;
for each neighbor traffic of the plurality of neighbor traffic, mapping a complete flight path trajectory from its origin to its intended destination;
generate the safe sonic altitude for the ownship responsive to processing each complete flight path trajectory of neighbor traffic;
receive, via automatic dependent surveillance broadcast (ADS-B), a real-time update to more than one of the neighbor traffic flight path trajectories;
update the safe sonic altitude based on the more than one real-time updates to the neighbor traffic flight path trajectories;
transmit the updated safe sonic altitude to ATC;

receive an assignment to the updated sonic altitude from ATC and flight instructions for achieving the updated safe sonic altitude; and notify the pilot of the assignment to the updated safe sonic altitude and flight instructions for achieving the updated safe sonic altitude.

16. The flight control system of claim 15, wherein:

the update to the sonic altitude comprises a lateral flight path offset for the ownship; and the control module is further configured to, responsive to receiving the assignment to the sonic altitude, notify the pilot of the assignment to the lateral flight path offset.

\* \* \* \* \*